Oct. 8, 1940.  F. S. BASTER  2,216,801
INTERNAL COMBUSTION ENGINE
Filed Nov. 26, 1938  3 Sheets-Sheet 1
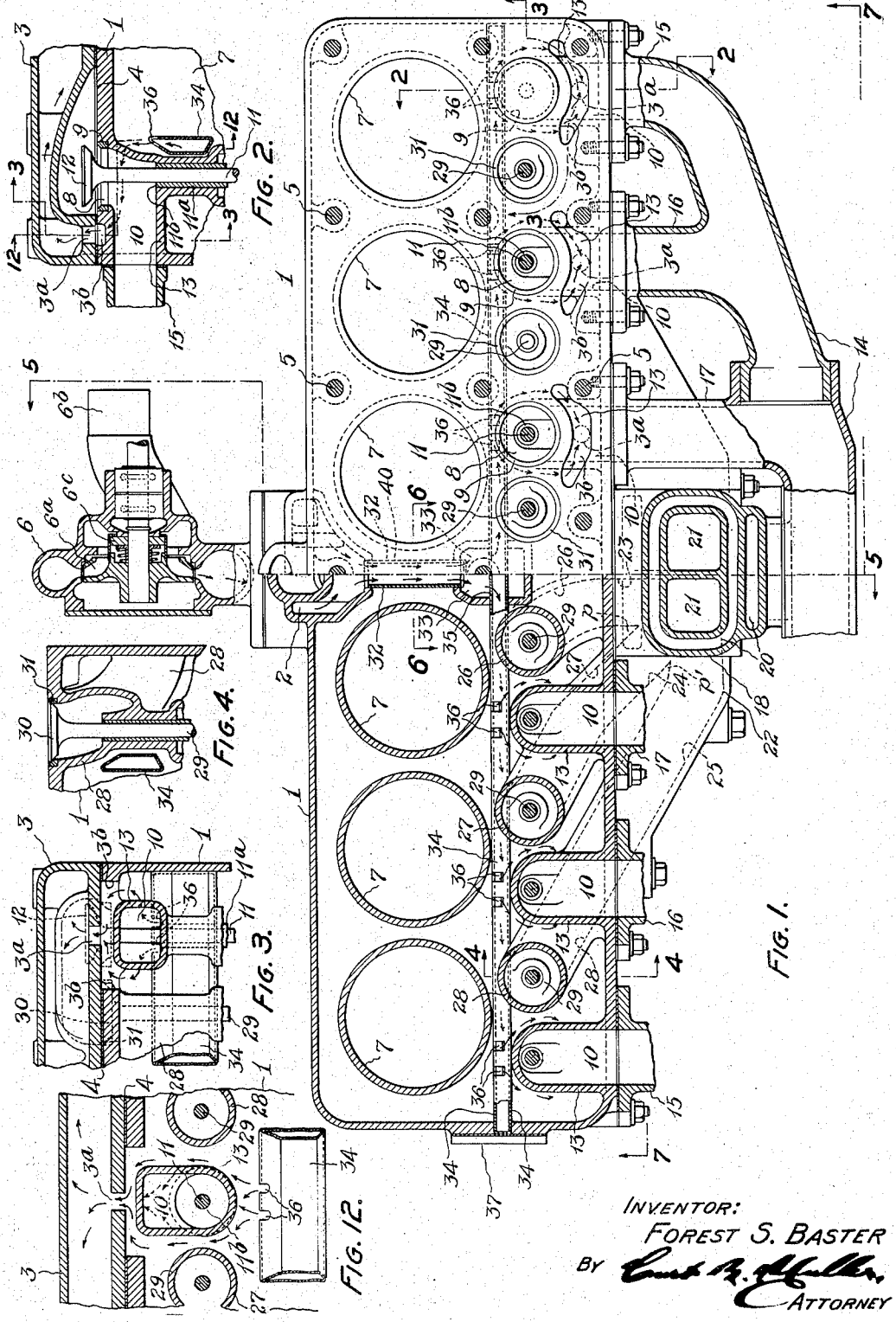
INVENTOR:
FOREST S. BASTER
By
ATTORNEY Oct. 8, 1940.  F. S. BASTER  2,216,801
INTERNAL COMBUSTION ENGINE
Filed Nov. 26, 1938  3 Sheets—Sheet 2
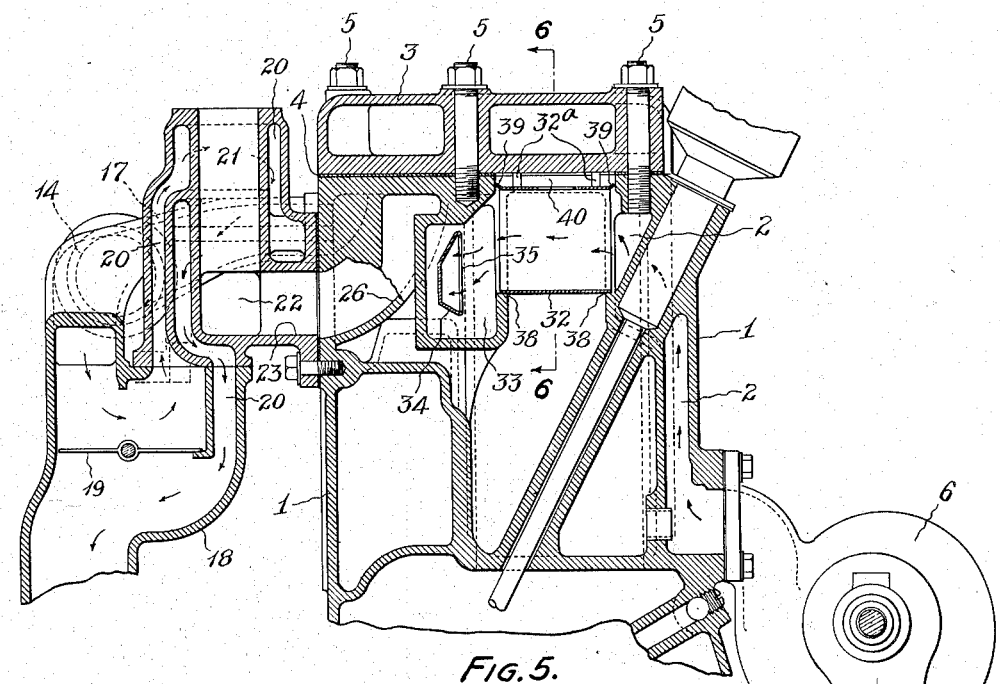
FIG. 5.
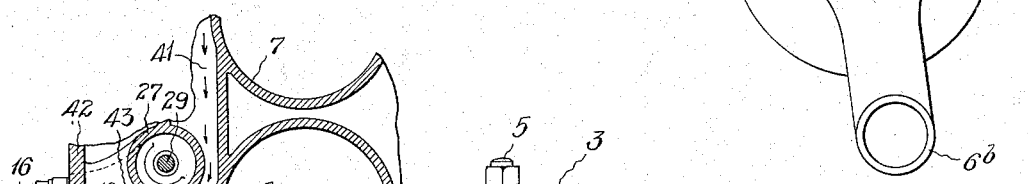
FIG. 13.   FIG. 6.   FIG. 15.
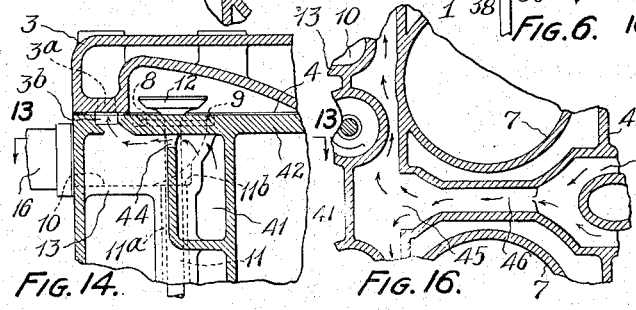
FIG. 14.   FIG. 16.
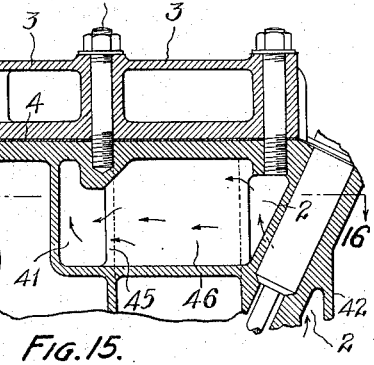
INVENTOR:
FOREST S. BASTER
BY
ATTORNEY Oct. 8, 1940.  F. S. BASTER  2,216,801
INTERNAL COMBUSTION ENGINE
Filed Nov. 26, 1938   3 Sheets-Sheet 3
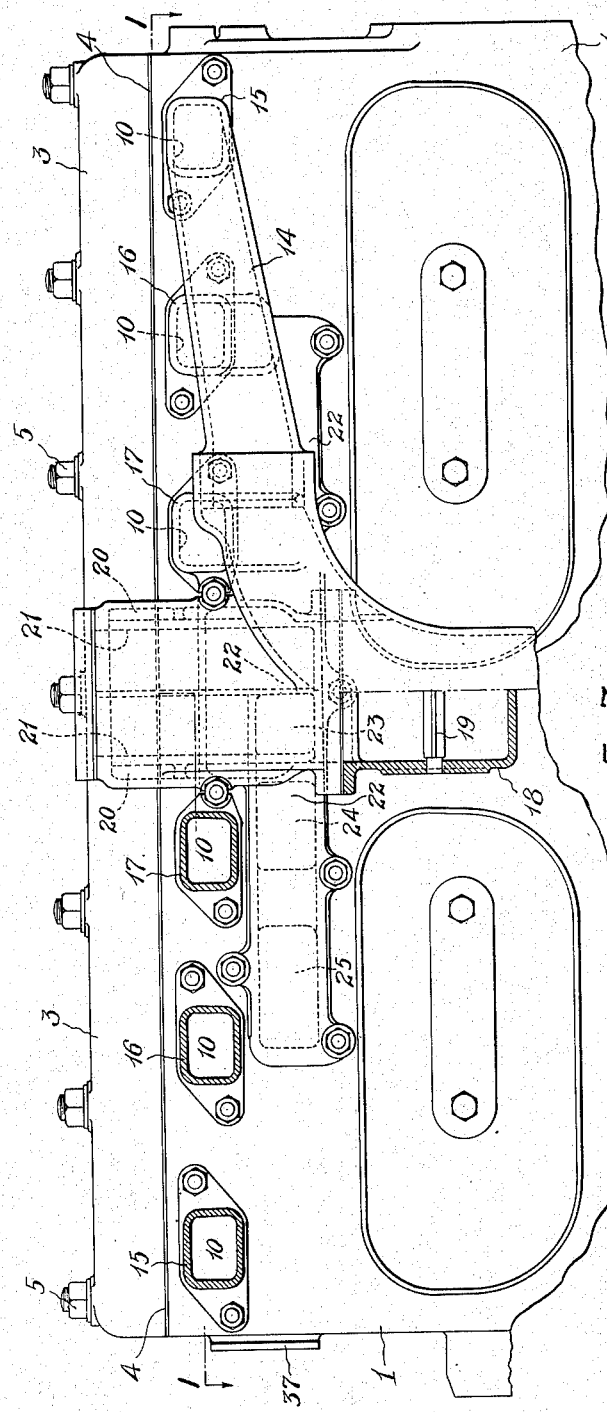
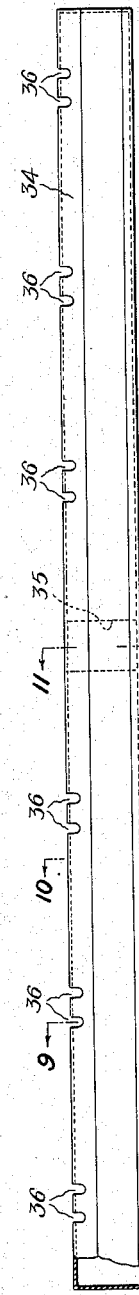
INVENTOR:
FOREST S. BASTER
BY
ATTORNEY Patented Oct. 8, 1940

2,216,801

UNITED STATES PATENT OFFICE 2,216,801

INTERNAL COMBUSTION ENGINE

Forest S. Baster, Cleveland, Ohio, assignor to The White Motor Company, Cleveland, Ohio Application November 26, 1938, Serial No. 242,529

4 Claims. (Cl. 123—173)

My invention, entitled "Internal combustion engine," pertains more specifically to a peculiar interrelation and cooperation of an intake manifold, exhaust manifold and water cooling system, the latter being especially adapted for improved performance because effecting more uniform cooling of the exhaust valve seats, all in association with a composite engine block.

One of the objects of my invention is to provide a construction of exhaust ports in which the exhaust valve seats near the top of the cylinder block are water cooled on all sides or with circuitous uniformity; the thickness of the exhaust-port-enveloping wall being substantially uniform to contribute to realization of a uniform cooling of the valve seats. Another object has been to provide an improved circulating water system in which the cooling liquid is fed from a pump of improved design through a crosswise tube and into a longitudinal distributing tube which may be removably located in subjacent relation to the valve seats while immersed in the water surrounding the engine block and such distributing tube having a middle opening to receive the cooling water from the crosswise tube, whereby opposite ends of the cylinder block receive water at the same temperature, and also having along its top correspondingly spaced outlet openings adjacent to the valve seats respectively. A further object has been the design of advantageous details in the construction of the crosswise tube permitting its ready insertion through an opening in the top of the engine block and with such tube provided with flange extensions along its upper margin adapted yieldingly to seat in the block opening. Another object has been quickly to conduct the exhaust gasses through the shortest possible routes through the engine block so as to minimize heat transference to the water contained in the jacket thereof and more particularly to minimize back pressure on the engine. A further object has been to provide an intake manifold below the exhaust manifold and fashioned with branches of differing length and predetermined ratio of cross-sectional area, which branches occupy substantially the same mean plane and divaricate from a common fuel distributing point and some of which must necessarily cross underneath branches of the exhaust manifold, whereby to avoid segregation of heavy fuel ends and to insure a more uniform fuel distribution to the cylinders and therefore improved engine efficiency.

A further interrelation between the inlet and exhaust manifolds is established in consequence of an arrangement of the exhaust branches so that all of them may optionally discharge into a heating chamber enveloping a fuel inlet pipe. The intake manifold branches are also advantageously partitioned to compel fuel condensation or heavy ends to be equally divided to a plurality of branches because each partition commences immediately adjacent to the wall of the fuel inlet duct. Another detail improvement resides in the exhaust-passage-exposed-formation of the guides for the exhaust valve stems such that the guide's exposed surface may be said to merge with the surrounding exhaust passage wall so as to insure flow of the cooling water past the stem guide and frustrate valve stem sticking.

Adverting to the drawings:

Figure 1 is a partial plan view and partial plan section of an engine cylinder block assembly, some of the valve heads being omitted for purposes of clearness.

Figure 2 is a fragmentary transverse section through one of the exhaust ports as viewed, for instance, on line 2—2 of Figure 1.

Figure 3 is a longitudinal section viewed on the plane indicated by line 3—3 at the right end of Figure 1 and also indicated on Figure 2; this view cutting through the exhaust port to show the space for cooling water completely surrounding it and to show the outlet passage therefrom into the detachable engine head.

Figure 4 is a fragmentary transverse section through an inlet valve as viewed on the plane indicated by line 4—4 of Figure 1.

Figure 5 is a transverse section through the upper portion of the entire engine, taken on line 5—5 of Figure 1, to show the path of travel of the circulating water from a pump, through the engine jacket, through the crosswise tube and into the longitudinal distributing tube.

Figure 6 is a fragmentary transverse section viewed on line 6—6 in Figure 5.

Figure 7 is a partial side elevation and partial vertical longitudinal section to disclose the interrelation of the inlet and exhaust manifolds, the line on which Figure 7 is viewed being also indicated in Figure 1.

Figure 8 is an elevation of the distributing tube detached from the engine.

Figures 9, 10 and 11 are sectional views taken on correspondingly marked lines across Figure 8.

Figure 12 is a diagrammatic view taken on zigzag line 12—12 of Figure 2 to show the passage of cooling water from a pair of distributor tube holes around the exhaust passage, exhaust valve seat and to the head.

Figure 13 is a fragmentary plan sectional view of a cylinder block similar to a portion of Fig. 1 showing a modification of this invention in which the distributor tube is cast integrally with the cylinder block, this view being taken on line 13—13 in Figure 14.

Figure 14 is a vertical sectional view of the modification shown in Figure 13, this view being taken on line 14—14 in Figure 13.

Figure 15 is a fragmentary vertical sectional view similar to a portion of Figure 5 showing a modification of this invention in which the cross over tube is cast integrally with the cylinder block.

Figure 16 is a fragmentary plan sectional view taken on the line 16—16 of Figure 15.

An engine block 1 comprises a water jacket 2 which includes a vertical passage 2 located on one side of the engine as shown in Figures 1 and 5. The top of the engine block is covered with the conventional head 3 to confine a gasket 4 and to be secured by a series of bolts 5. A pump 6 of original design to include a closed impeller 6a, shown in Figure 1, also has a carbon spring pressed packing element 6c and fluid passages perfectly proportioned for exponential expansion. In both Figures 1 and 5 the pump is shown provided with an inlet 6b to be regarded as connected with a conventional cooling radiator.

The engine block is fashioned, as illustrated, with a row of six cylinders 7 and laterally adjacent each cylinder with an exhaust port 8 enveloped by a valve seat 9 through which port, discharge is had through an exhaust passage 10, all as clearly shown in Figure 2. An exhaust valve stem 11 extends upwardly through an appropriate guide 11a, the top 11b of which may be observed in Figure 2 to merge with the surrounding wall of the exhaust passage 10 so that there is no obstruction which cannot be cooled and hence heats up and binds the valve stem, projecting into the exhaust passage 10 around the stem 11 which carries at its free end a valve 12 adapted to fit the seat 9. In Figures 3 and 12 may be further observed the uniformity in thickness of the exhaust passage enclosing wall 13. An exhaust manifold 14 has at each end of the engine three substantially parallel and short length branches 15, 16 and 17 which have straight line communication with the six exhaust passages 10.

There is shown in Figures 1, 5 and 7 a fuel inlet and exhaust-gas-heated assembly comprising a casing 18 which will be very briefly described because not to be claimed. Within the casing 18 is a heat control valve 19 which, when in its open position, permits direct escape past it of the exhaust gases, but which, when closed, compels the exhaust gases to take the route indicated by the arrows on the left side of Figure 5 through the enveloping passage 20 which surrounds the dual carbureted mixture supply pipe 21 which will be fed from a carburetor, not shown.

Leading from the bottom of the dual, carbureted mixture supply pipe 21, of which each division is for one of the three sets of cylinders at one end of the engine, is an intake manifold 22 (so marked in Figure 5). Divaricating from the middle of the manifold are two sets each of three intake branches and each set comprises a branch 23, a branch 24 and a branch 25, which numbering appears to view in Figures 1 and 7.

The three intake branches of each set are substantially in the same mean plane and follow substantially direct routes to their respective cylinders, but by reason of their divaricating arrangement must cross under certain of the exhaust branches 15, 16 and 17. As clearly shown in Figures 1 and 7, the sets of intake branches are necessarily of varying lengths, but it is also to be observed in the named two figures that the cross-sectional areas of the three branches of each set are also different and, in fact, according to a predetermined ratio so that the shortest branch 23 is of the smallest cross-sectional area, the longest branch 25 of the largest cross-sectional area, while the middle branch 24 likewise has its cross-sectional area in direct predetermined proportion to its length. Moreover, the three registering inlet passages 26, 27 and 28 in the engine block are respectively alined with the branches 23, 24 and 25 and of corresponding cross-sectional size, each with respect to its registering complement. Thereby, a very compact and efficient composite intake manifold structure is realized to effect a smooth and uniform distribution of the explosive charge. However, to still further improve, particularly by uniform segregation or division of the heavy as well as of the light fuel ends, the walls of each adjacent pair of branches 23, 24 and 25 merge as partitions p and p' and said pair of partitions at each end of the engine are caused to extend as closely as feasible to their common distributing passage 22 whereby an equal triple division of the heavy fuel ends has been accomplished. This realizes an important benefit because it has long been understood that a uniform distribution of the supposedly unavoidable heavy fuel ends was a desideratum. Figure 4 illustrates a rather conventional inlet valve structure comprising a stem 29, valve 30 and seat 31.

The pumped water, after rising in the vertical passage 2, travels through a transversely disposed quadrilateral crosswise tube 32 which is formed of relatively light material and is open at both of its ends as shown in Figures 1 and 6. After passing through the crosswise tube 32, the water enters a jacket chamber 33. Passing longitudinally through the chamber 33 and extending from one end of the cylinder block to its other end is a distributing tube 34 shown as a detail in Figures 8 to 11, inclusive, and shown in its inserted position in Figures 1 to 4, inclusive, and 12. The distributing tube 34 has an opening 35 at the center of the engine, as shown in Figures 1 and 5, through which opening the water may enter it from the crosswise tube 32. Along its top the distributing tube 34 is provided with six pairs of adjacent openings 36, each pair being adjacent to and on opposite sides of one of the exhaust passages 10, whereby the water discharged from the tube 34 is caused to flow directly against and around the walls adjacent to the valve seats, as may be clearly understood upon inspection of Figures 2, 3 and 12. As illustrated, the distributing tube 34, which has both ends closed, is inserted into the water jacket through an opening in one end of the cylinder block and such opening is closed by a flange 37 shown in Figures 1 and 7. I record my realization that the tube 34 need not be a separable unit and it may later be a portion of the water jacket and defined by walls integral with the block. After leaving the tube 34, the cooling water flows against the annular wall supporting each exhaust valve seat 9, also unimpededly around each exhaust valve stem 11, through the exhaust passage 10 and up into the water jacket of the head 3 through openings 3a. In communication with the openings 3a are snail-shaped passages 3b which are recesses in the top of the engine block and which are disclosed in Figures 1 and 3. The ends of each one of the passages 3b communicates with one of the midway openings 3a and the purpose of the water flow through such six passages is to complement above each exhaust port the major circumferential arc described below each exhaust port by the water flow from the openings 36. Thereby the cooling completely around each exhaust valve seat is effected and the desirable uniformity of temperature and of thermal expansion accomplished because preventing warpage and because insuring leakless valve closure.

The crosswise tube 32 is formed of relatively light material and abuts shoulders 38 shown in Figure 5 and the open ends of the tube 32 register with suitable water openings in the block jacket. Opposite ends of the upper margin of the tube extend as lateral projections in the form of flanges 39 and, as may also be seen in Figure 5, these flanges define a size slightly larger than an opening 40 which is formed in the top of the cylinder block to receive the tube 32. In consequence, when the tube is inserted in the cylinder block, the flanges 39 flex upwardly slightly, whereby the spring fit effectively prevents the upward displacement of the tube in normal operation. Upwardly projecting pins 32a are additionally provided in the upper wall of the crosswise tube 32 which are engaged by the under face of the head 3 so that the seating of the tube 32 on the shoulders 38 is accomplished.

Figures 13 to 16 illustrate a modification of this invention in which the crosswise tube 32 and the detachable distributing tube 34 are replaced by corresponding integrally formed passages disposed in substantially the same positions and performing substantially the same functions as the previously described elements 32 and 34. The modified distributing passage 41 is cast integrally with the block 42 as shown particularly in Figures 13 and 14. The passage 41 is formed with pairs of outlets 43 and 44 laterally adjacent to opposite sides of each exhaust passage 10 respectively to cause the cooling fluid, after egress from the outlets 43 and 44, to flow around each passage 10 and thence obliquely upwardly into the head through the opening indicated at 3a. The distributor passage is formed substantially centrally of the block with an opening 45 communicating with the integrally cast crosswise passage 46 as best shown in Figures 15 and 16. The passage 46 receives fluid from a circulating pump which delivers the fluid into the vertically disposed passage 2. It will be evident that the integrally formed crosswise passage and distributor passage will function effectively and uniformly to cool the entire periphery of the exhaust valve seat as well as the wall of the exhaust passage 10 in the block.

An internal combustion engine being essentially a heat engine, its behavior is affected by the control of the generated heat. For the best engine output with a given fuel there should probably be the maximum amount of homogeneous mixture reaching each cylinder and after ignition dissipation of the minimum of generated heat into the cooling water. Consequently it is to be supposed that the inter-relation of the intake and exhaust manifolds is a functionally important phase of engine design. Heat transfer from the exhaust manifold to the intake manifold is often desirable and heat transfer from the exhaust passage, exhaust valve stem and exhaust valve seat to a circulating water stream is always required in order to minimize both mechanical and thermal distortion either of the exhaust valve seat or of the exhaust valve stem or its guide.

My intake manifold with its single division zone and a plurality of cylinder-connected branches with partition therebetween extending closely adjacent to the division zone and with the branches having the shortest possible varying lengths and therefore the minimum of exposed area insures a reduction in the amount of condensate so that the latter is compelled to travel to the cylinder for which it was initially intended, whereby to avoid unequal measures thereof reaching different cylinders. Important also to the desirable closer approach to uniformity of fuel distribution to all cylinders is the proportioning of the cross sectional area of the intake manifold branches in direct ratios to their lengths. As exemplified in the drawings and considering only one-half of the dual manifold, the three branches 23, 24, and 25 are in the ratio of eight, nine and ten so that the longest branch has the largest area. Consequently it is desirable to effect alignment of each intake manifold branch with its registering fuel passage through the engine block. A greater fuel economy is also realized because the condensate from a carbureted mixture in a vaporized and/or gaseous state is composed chiefly of the higher end points of the fuel.

The inter-relation here shown of an exhaust passage, its valve seat and its valve stem guide, all with respect to the circulating water system, is such that a portion of the cooling medium soon after discharge by the pump is led closely to and directly at a point between the exhaust valve seat and the cylinder wall, whereby the water flow is around the entire valve and port periphery. My design furthermore establishes the distance from the valve seat to the water as circumferentially uniform. The cool water is also directed at the bottom of the exhaust passage immediately adjacent to the upper end of the valve guide.

I claim:

1. In an internal combustion engine, a cylinder block having exhaust ports therein and having segmental arcuate recesses circumambient said ports, a water pump on one side of said block, a conduit transversely disposed within said block intermediate the ends thereof, fluid connections between said conduit and said pump, a tube within said block extending throughout the length thereof and communicating with said conduit, said tube having openings therein in juxtaposition with the zone of said segmental arcuate recesses in said block.

2. In an internal combustion engine, a cylinder block embodying exhaust valve seats and a water jacket, a pump, a conduit connected with said pump and extending across said block in the center portion thereof, a tube extending longitudinally of said block and connected with said conduit, the walls of said block being formed to define channels surrounding said valve seats, said tube having openings therein arranged in juxtaposition with said channels.

3. In an internal combustion engine embodying a cylinder block having exhaust valve seats therein and having a channel for the circulation of water therethrough and a chamber in the central portion of the block, a water pump in fluid communication with said channel, a conduit connected with said channel and in fluid communication with said chamber, a tube extended throughout the length of said block and supported by the walls defining said chamber and in fluid communication therewith, said tube having openings therein disposed in juxtaposition with said exhaust valve seats in said block.

4. In an internal combustion engine embodying a cylinder block having valve seats therein, channels for the circulation of water therethrough, a cylinder head having channels for the circulation of water therethrough and intercommunicating openings in said block and said head, a coolant circulatory system comprising, a water pump mounted on said block, a conduit intermediate the ends of the block and disposed transversely thereof in fluid communication with said pump, a tube connected with said conduit and extended throughout the length of said block, said block having arcuate recesses partially surrounding said valve seats, and being in fluid communication with the intercommunicating openings in the head and block, said tube having openings therein contiguous said recesses, whereby the coolant discharged from said tube openings is circulated over the walls of the block defining the exhaust valve seats and thence through the recesses to the cylinder head.

FOREST S. BASTER.